March 1, 1966  M. C. PFISTER  3,238,374
PHOTOELECTRIC MEASURED-VALUE TRANSMITTERS
Filed Nov. 27, 1959  4 Sheets-Sheet 1

*INVENTOR.*
MARCEL CHARLES PFISTER
BY
*Jones, Darbo & Robertson*
Attorneys

March 1, 1966  M. C. PFISTER  3,238,374
PHOTOELECTRIC MEASURED-VALUE TRANSMITTERS
Filed Nov. 27, 1959  4 Sheets-Sheet 3

INVENTOR.
MARCEL CHARLES PFISTER
BY
Jones, Darbo & Robertson
Attorneys

March 1, 1966  M. C. PFISTER  3,238,374
PHOTOELECTRIC MEASURED-VALUE TRANSMITTERS
Filed Nov. 27, 1959  4 Sheets-Sheet 4

INVENTOR
MARCEL CHARLES PFISTER
BY
Jones, Darby & Robertson
Attorneys

United States Patent Office 3,238,374
Patented Mar. 1, 1966

3,238,374
PHOTOELECTRIC MEASURED-VALUE
TRANSMITTERS
Marcel Charles Pfister, 24 Rue des Pres, Eckbolsheim,
near Strasbourg, France
Filed Nov. 27, 1959, Ser. No. 855,766
Claims priority, application Germany, Nov. 27, 1958,
P 21,792
22 Claims. (Cl. 250—219)

The invention relates to a photoelectric measured-value transmitter.

The problem underlying the invention is to obtain photoelectrically a measured value for the position of a measured object. According to the invention, this problem is solved by scanning a field of view periodically, through movable optical deflecting means, by means of a photoelectric receiver, and making use of the phase position of the pulse delivered by the receiver in relation to a synchronized comparison alternating voltage for the purpose of forming a measured value for the position of an object aimed at.

The photoelectric receiver may be a photoelectric cell, a photoelectric diode, a resistance cell (a PbS cell) or, for example, a thermoelectric element. The optical deflecting means may, for example, be in the form of a lens wheel, in the center of which the receiver is arranged, or in the form of a polygonal mirror.

Additional objects and advantages may be apparent from the disclosure as a whole.

The drawings represent a few examples of embodiment and cases of employment of the invention.

Although the following disclosure offered for public dissemination is detailed to ensure adequacy and aid understanding, this is not intended to prejudice that purpose of a patent which is to cover each new inventive concept therein. The claims at the end hereof are intended as the chief aid toward this purpose, as it is these that meet the requirement of pointing out the parts, improvements, or combinations in which the inventive concepts are found.

*The optical and mechanical construction*

Figure 1:
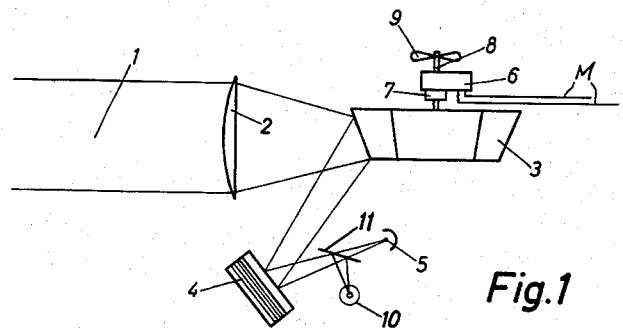
FIGURE 1 shows, purely diagrammatically, the path of the rays in the case of a measured-value transmitter according to the invention.

The optical and mechanical construction of the photoelectric measured-value transmitter is represented purely diagrammatically in FIG. 1. Light from source 10 is incided on the area to be viewed through semitransparent mirror 11 and the remaining optical system hereinafter described. If a self-luminous source is being viewed or other lighting is provided, e.g. silhouette lighting, source 10 and the semitransparent mirror 11 may be eliminated. In any event, light received from the area being viewed is represented by measuring beam 1. The measuring beam 1 is collected on to a polygonal mirror 3 by a cylindrical lens 2. The axis of the cylindrical lens 2 lies across the axis of the polygonal mirror 3. The beam is projected by the polygonal mirror 3, by way of a cylindrical concave mirror 4, on to a radiation receiver 5, for example in the form of a PbS cell. The axis of the cylinder 4 is arranged across the axis of the cylindrical lens 2, and in an axial plane of the polygonal mirror 3, so that the system scans as each mirror of polygonal mirror 3 rotates across the beam. Owing to the action of the two crossed cylinders 2 and 4, an exact point focussing is always obtained on the radiation receiver 5, regardless of how obliquely the beam 1 is incident in accordance with the position of the polygonal mirror 3. If it were desired, instead, to effect a focussing by means of spherical lenses or mirrors, a more or less highly distinct comatic image would always be obtained with a very oblique incidence of the beam 1. In this way, the pulse delivered by the radiation receiver would be blurred. This cannot be tolerated for many of the cases of application of the invention hereinafter described.

The polygonal mirror has the shape of a truncated pyramid and is formed by ten plane mirrors. It is driven by a motor 6 through a gear 7. The motor 6 has a comparatively great speed of revolution, for example 3000 revs. per minute with 50 cycle current, and is reduced by the gear to, for example, one-fifth or 600 revs. per minute. A fan 9 may be mounted on the driven shaft 8 of the gear 7, or any other additional constant load, by which the action of the gear 7 is reduced, is mounted on the said driven shaft. In this way, a sufficiently steady running of the mirror can be obtained, as is absolutely necessary for many cases of employment of the invention.

The motor 6 is a synchronous motor which is fed by the mains.

In the arrangement described, a visual angle of 72° is scanned with a frequency of $$10 \cdot \frac{600}{60} = 100 \text{ cycles}$$

or scans per second. The beam 1, which arrives on the receiver 5, always scans in the same direction: for example from back to front in FIG. 1. For 60 cycle current, the r.p.m. should be 720 to yield 120 scans per second.

The kind of receiver employed depends upon the objects to be scanned. In the case of self-luminous objects, for example, glowing rolled material, a resistance cell (lead-sulphide cell) may be employed with advantage. That instantaneous part of beam 1 which at a given position of mirror 3 is "viewed" by photoelectric receiver 5, may be called the axis of sensitivity. On a rotation of the mirror 3, only the axis of sensitivity travels. In the case of nonluminous objects an auxiliary source of light may be provided. It may flood the scanned area or it may be a scanning beam. For this latter purpose, as is indicated in FIG. 1, there may be arranged, in the vicinity of the receiver 5, a lamp 10 which sends a beam, by way of a semitransparent mirror 11, to the cylindrical mirror 4, the polygonal mirror 3 and the cylindrical lens 2. This is reflected or not according to whether the beam 1 is or is not incident on the object. If the object will not reflect back along the beam, there may be arranged, behind the object, for example a triple reflector which reflects into itself the light incident thereon, so that the light is again incident, by way of the path indicated, on the radiation receiver 5 as long as the beam 1 of light has not yet reached the object.

*The connection of the measured-value transmitter*

Figure 2:
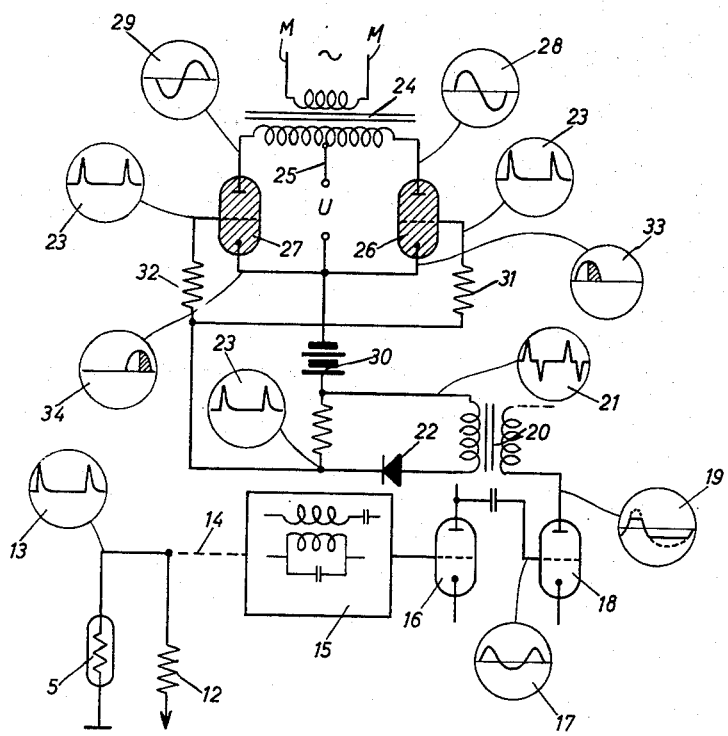
FIGURE 2 shows, also diagrammatically, the corresponding electrical connections.

The connection of the measured-value transmitter is represented diagrammatically as an example in FIG. 2. The signals, as found at the separate points of the circuit, are indicated as oscillograph images. 5 (FIG. 2) denotes the receiver, which is in the form of a resistance cell (PbS cell) which varies its resistance in response to received radiation. In this way, there will be produced, on a voltage-divider that is formed by the resistance cell 5 and a resistor 12, which may be assumed to be jointly subject to a constant voltage, pulses in accordance with the oscillograph image 13, every time the axis of sensitivity 1 (FIG. 1) detects the measured object. It is to be assumed that the measured object is a self-luminous body, for example a glowing billet in a hot rolling mill.

The pulses 13 are received, through a wire 14, by the circuitry of the test head. For the purpose of suppressing disturbing stray voltages, which may be induced in the wire 14, a filter is provided, which is denoted generally by 15. The pulses then arrive on the grid of an alternating-current amplifier 16. This gives a voltage which corresponds approximately to the oscillograph image 17. The voltage according to 17 is applied to the grid of an over-modulated amplitude-limiting valve 18. This gives a voltage which corresponds approximately to the oscillograph image 19. However, it must be realized that, in reality, the amplitudes are considerably greater than is represented on the oscillograph image 19, so that practically vertical breaks are produced at the sides of the curve. In practice, there are employed a plurality of series-connected amplitude-limiting valves, of which, for the sake of simplicity, only one (18) is represented here. The signal thus obtained and represented by the oscillograph image 19 is fed to a differential member in the form of a transformer 20, at the secondary winding of which positive and negative pulses according to the oscillograph image 21 are obtained.

It is to be observed that phase displacements, which may occur in the individual amplifying stages and in the transformer, are harmless, since they can be compensated by corresponding adjustment of the angular position of the polygonal mirror 3 (FIG. 1). For this purpose, the mirror 3 can be shifted about its axis 8 in relation to its driving means. The negative pulses shown at 21 are cut away by a rectifier 22, so that a signal in accordance with the oscillograph image 23 is produced. The phase position of the pulse according to 23 depends on the position of the object aimed at in the field of view covered by the test head.

A transformer 24 has its primary coil connected to the mains M which also feed the synchronous motor 6 (FIG. 1). The secondary coil of transformer 24 with a central tap 25, powers the plate circuits of two thyratrons 26 and 27, in opposite phases. The course of the anode or plate voltages of the two thyratrons 26 and 27 is represented in the oscillograph images 28 and 29. The controlling grids of the thyratrons 26 and 27 are given a negative biassing voltage by the source of current 30, so that the thyratrons are normally blocked. The positive pulses 23 are now transmitted to the controlling grids through resistors 31 and 32.

If the mains voltage (28, 29) has 50 cycles per second, the pulses arrive with a frequency of 100 cycles per second. In short, the scanning or pulse frequency is double that of the reference voltage. Consequently, the thyratrons 26 and 27 receive a pulse 23 in each half-wave. The pulse is sufficient for igniting the thyratrons 26 and 27, but, naturally, only when and as long as the anode voltage 28, 29 is positive. Since the thyratrons 26 and 27 are fed in opposite phases by the transformer 24, the thyratrons are sequentially ignited by alternate pulses. The first pulse 23 ignites the thyratron 26, which burns until the anode voltage 28 again becomes zero (oscillograph image 33). The second pulse 23 correspondingly ignites the thyratron 27 (see the oscillograph image 34). The thyratron 26 cannot ignite in the second pulse, because, at that instant, the anode voltage 28 is, in fact, negative.

The thyratrons 26 and 27 burn for a longer or shorter time according to the phase position of the pulses 23 in relation to the mains voltage 28. If the igniting pulse arrives as soon as the anode voltages have become positive, the thyratrons burn practically during the whole half-wave. If the pulse arrives only shortly before the voltage again passes through zero, the thyratron immediately becomes extinguished and practically does not burn at all. The arrangement consequently represents a phase-controlled two-way rectifier, or a phase modulated full-wave rectifier. The average measuring voltage U (FIG. 2) is consequently a measurement of the phase position of the pulses 23 and; consequently, of the position of the object scanned in the field of view of the test head.

Instead of two thyratrons that are fed in opposite phases, two thyratrons, which are connected antiparallelly may be provided. The test head according to the invention may have very different applications. A few cases of employment are hereinafter described by way of example.

*Speed-regulation*

Figure 4:
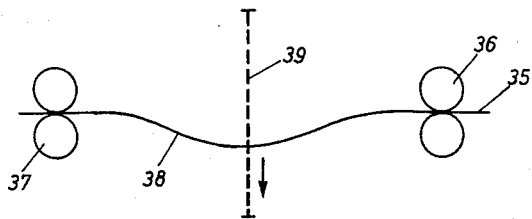
FIGURES 4 and 5 show diagrammatically two examples of employment, in which speeds are regulated with the aid of the measured-value transmitter according to the invention.
Figure 5:
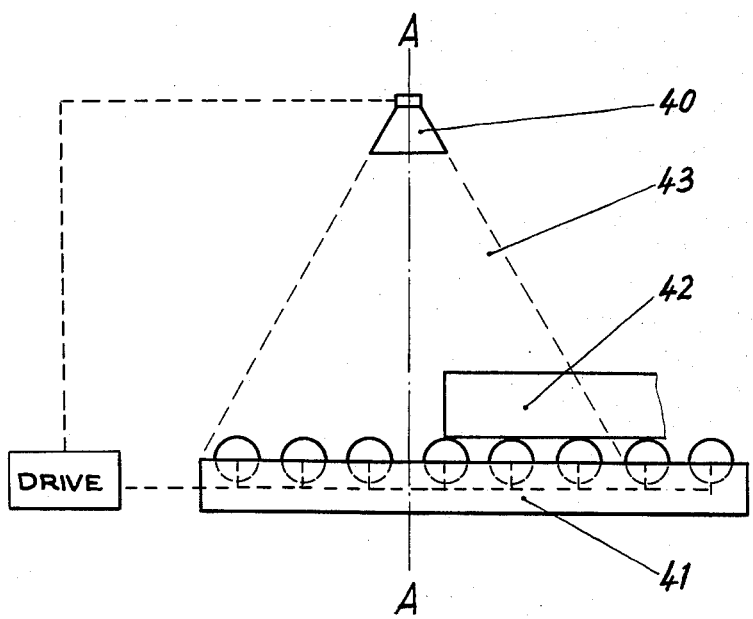

There are very different cases of employment, in which a speed is regulated in dependence upon the measured value obtained. Two examples are represented in FIGS. 4 and 5. FIG. 4 shows the employment of the invention for loop regulation in rolling mills. When the material 35 being rolled is running successively through two pairs of rollers 36 and 37, the speeds of the pairs of rollers must be adjusted to each other. If the rear or downstream pair of rollers 37 is running too rapidly in relation to the front pair 36, the material being rolled is stretched and tears and, if it is running two slowly, a loop is formed which continually grows larger and which, in certain circumstances, is also no longer controllable. However, since the adaptation of the speeds of the rollers to each other can, in practice, be carried out with the necessary accuracy, there is left, between the rollers, a loop 38 of the material being rolled, which loop can compensate for any small fluctuations. The size of these loops is then regulated. If the loop 38 is too large, the rollers 37 must rotate faster, and, if it is too small, so that there is a danger that the material being rolled will be torn, the rollers 37 are slowed down.

A measured-value transmitter according to the invention is very suitable for such a loop regulation. As is represented in FIG. 4 by a broken line 39, a field of view is periodically scanned in the plane of the loop 38 by the test head. On every passage of the material, the test head at once detects the glowing material being rolled and delivers a pulse. There is produced, in the manner described in connection with FIG. 2, a measuring voltage U which depends upon the size of the loop 38. With the aid of this measured value U, the speed of the rollers 37 can be regulated in the manner more fully described hereinafter.

An example of another embodiment, shown in FIG. 5, is an "optical stop" for material being rolled or the like. It is frequently necessary to separate a part from a rolled material, for example a cooled tip, that is to say to cut or saw it off. The rolled material is then conveyed down on a rolling path. The rolling path consists of a plurality of rollers which, as a rule, are driven separately by regulatable electric motors. In known arrangements, there is then provided, behind the shears or saw, a stop at which the rolled material comes to rest. The shearing or sawing device then comes into action. Before the rolled material encounters the stop, the speed of travel of the rolled material is somewhat reduced by hand control in order to prevent a too powerful stoppage. However, because the piece of rolled material may, in certain circumstances, have a weight of a number of tons, it can be seen that the stop must be made very heavy and is subject to great wear. In addition, care should be taken that the speed on the rolling path is not too sharply braked, so as to cause the block to slip. Consequently, in known installations, very vigorous impacts occur, notwithstanding everything. After the operation is carried out, the stop must be swung out of the path of the block and the path freed. For this purpose, heavy machines are necessary. In addition, it takes a considerable time until the installation is again ready for operation.

With a measured-value transmitter according to the invention, an "optical stop" can be provided, by means of which the production of such a heavy mechanical stop with its aforesaid disadvantages can be obviated. Such an arrangement is represented purely diagrammatically in FIG. 5. 40 denotes a test head according to the invention, which is arranged at a height, which is as great as possible, above a rolling path 41, the rollers of which are driven by a regulatable electric motor (not shown). A block 42 is conveyed along the rolling path 41. The block 42 is to come to rest, with its front face, in an assumed plane A—A, so that shears or the saw (which are likewise not shown) can become operative.

As soon as the block 42 enters the field of view 43 of the test head 40, the latter delivers a measured value U in the manner represented in FIG. 2. For example, the measured value U may operate a servomotor which in turn operates a device, e.g., rheostat means, controlling the speed and direction of rotation of the direct current motors of a motor-generator set. The direct current motors in turn are connected to rollers 41. The speed of the rollers 41 can be regulated in dependence upon the said measured value U, so that the rollers 41 begin to run more slowly as soon as the block 42 enters the field of view of the test head and continue to become slower the nearer the block 42 comes to the plane A—A. When the front face of the block 42 lies in the plane A—A, the rollers 41 are at a standstill. If the block slips to somewhat beyond the plane A—A, the rotation of the rollers reverses. In this way, the block is braked by the rollers 41 themselves, the braking action of the rollers setting in only slowly, so that slipping of the block 42 is prevented. A mechanical stop is no longer necessary. After the shears have come into operation, the "optical stop" is disconnected and the block can continue to travel unhindered.

Figure 3:
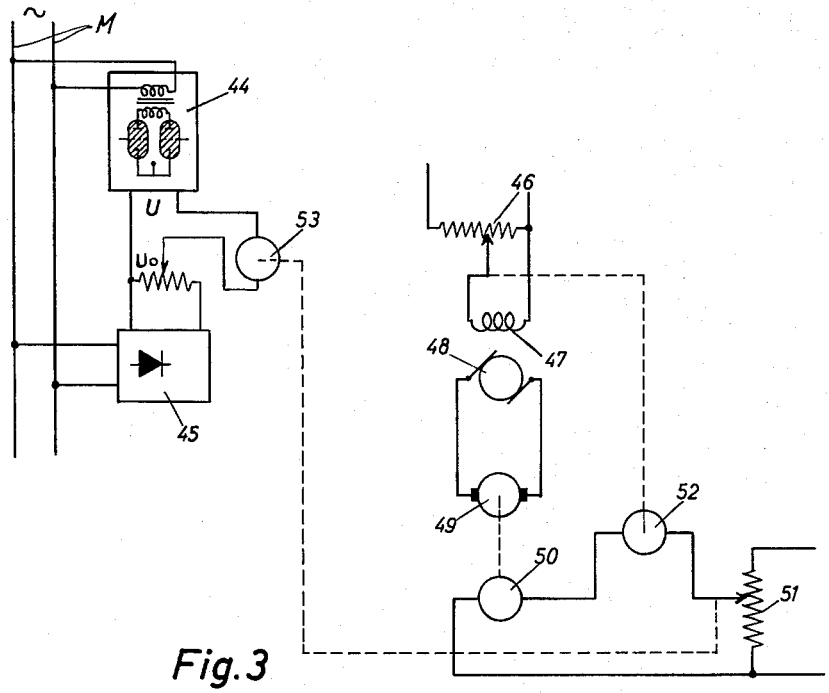
FIGURE 3 shows diagramatically the connections on the employment of the invention for regulating the speed.

FIG. 3 represents, by way of example, a wiring arrangement for a speed regulation with a measured-value transmitter according to the invention, as can be used for a loop-regulation, for example. 44 denotes a phase-sensitive rectifier which is controlled by the measuring pulses, as represented in greater detail in FIG. 2. The reference numeral 45 denotes a rectifier which is fed by the same alternating voltage mains M as the phase-sensitive rectifier 44 and which delivers a comparison voltage $U_o$. Preferably this comparison voltage can be adjusted to represent the desired value (in this case the desired droop of loop 38). The comparison voltage $U_o$ corresponds to a rated value of the measuring voltage delivered by the rectifier 44, in this instance the value the measuring voltage has with a desired length of loop 38. This system of comparing the measured value voltage with a comparison voltage derived from the same mains minimizes inaccuracy due to fluctuating line voltage, and can be widely used with this invention.

FIG. 3 represents, in its right-hand part, a usual speed regulation by means of a Leonard unit. The energization of the field coil 47 for a uniformly driven generator 48 is regulated by means of a potentiometer 46. The said generator feeds a motor 49 which drives, for example, the rollers 37 (FIG. 4).

Coupled with the motor 49 is a tachometer machine 50, to the voltage of which there is connected in opposition a stabilized voltage the value of which depends only on the setting of the tap at a potentiometer 51. This setting is adjusted for the roll speed desired. As soon as the speed of the motor 49 differs from the chosen speed and, consequently, the voltage of the tachometer machine differs from the voltage adjusted on the potentiometer 51, the voltage difference feeds a servomotor 52 which shifts the tap of the potentiometer 46.

By means of the voltage difference $U-U_o$ of the rectifiers, a servomotor 53, for example, can be controlled, which adjusts the potentiometer 51. If the loop 38 is too long, voltage U exceeds voltage $U_o$ and causes servomotor 53 to run in a direction to adjust potentiometer 51 in a speed increasing direction. If loop 38 is too small, voltage $U_o$ exceeds U and causes the opposite adjustment of potentiometer 51.

Instead of the arrangement described, any other known arrangement may be provided for regulating the speed of revolution, for example by means of thyratrons, and the control of the speed of revolution by the voltage $U-U_o$ may be effected in various ways. It depends very much on the regulating problem of each case. In particular, known means may be provided for stabilizing the regulating cycle and for obviating hunting.

Since the rectifiers 44 and 45 are fed by one and the same alternating voltage, possible small variations of the mains voltage are not noticeable in the magnitude of the regulated value. The latter depends only on the phase position of the pulses (FIG. 2).

Another application of the measured-value transmitter according to the invention is the regulation of the speed of working machines, such as shears, saws or welding machines which run along together with a rolled material that is being moved on a rolling path.

As is known, it is then no longer necessary to stop the roller material at the saw or the like. The saw runs along with the rolled material and comes into operation as soon as it reaches the same velocity as the rolled material. The regulation of this velocity may be effected by arranging a measured-value transmitter according to the invention on the working machine and regulating the running-along speed in dependence upon the output voltage of the measured-value transmitter, for example in the manner represented in FIG. 3. In this use, motor 49 would be driving the device which must keep pace, the scanning could show relative positioning, and voltage $U_o$ could correspond to correct relative positioning.

*Measurement of length and breadth*

The measured-value transmitter according to the invention also renders possible a very accurate measurement of lengths, breadths and thicknesses of material that runs through. Such a measurement is also of special importance for the technology of rolling mills. Thus, for example, the invention renders it possible to check continuously the width of rolled strips of sheet metal before the strips run on to a reel. Accordingly, the operation of the roll train can then be adjusted and deviation can be immediately compensated. It is, in fact, known that the width of such strips has frequently to be very accurately observed.

Another application is the measurement of the diameter of wound-up rolls, for example of sheet metal strips wound on a reel.

An arrangement according to the invention can also be employed for the measurement of the length of tubes. As is known, in the rolling of tubes, great differences in length and, accordingly, different thicknesses of wall are produced. The tubes are then measured and sorted. This is, in practice, very troublesome and tedious and conceals considerable sources of error. These disadvantages can be obviated with a length-measuring device according to the invention. Since the length-measuring value is, moreover, very rapidly obtained, it is possible to correct the rolling mill on the basis of this measured value in order to obtain end products which are as uniform as possible.

Figures 6, 7:
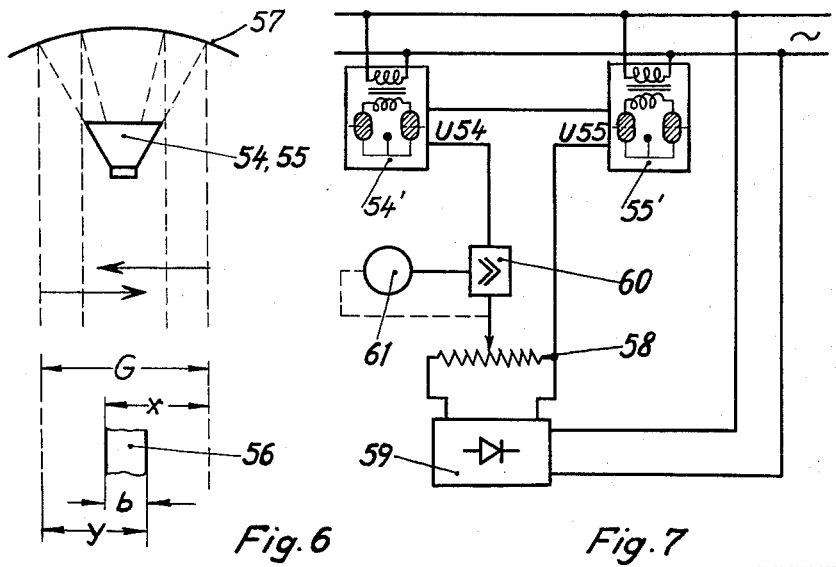
FIGURE 6 shows diagrammatically the construction.
FIGURE 7 shows the connections of a width-measuring transmitter constructed with two measured-value transmitters according to the invention.

FIGS. 6 and 7 represent diagrammatically a construction and connection of a width-measuring device according to the invention. The arrangement contains two test heads 54 and 55, only one of which is to be seen in FIG. 6 and which run in opposite directions. While the axis of sensitivity of one test head 54 travels from left to right, the axis of sensitivity of the other travels from right to left. Since great accuracy is important here, and it is important to be independent of the distance of the object 56 (FIG. 6) being measured, the test head is directed upwards on to a parabolic cylindrical mirror 57, so that while the axes of sensitivity travel in the direction of the arrows (FIG. 6) they remain parallel to themselves, and perpendicular to the dimension being measured.

The test head 54 or its output section 54' gives a voltage U54, which is proportional to the distance X of the left-hand edge of the object 56 being measured from the right-hand edge of the field of view. The test head 55 or its output section 55' correspondingly gives a voltage U55, which is proportional to the distance Y of the right-hand (FIG. 6) edge of the object being measured from the left-hand edge of the field of view. If G denotes the width of the whole scanned field of view and $b$ denotes the width of the object being measured, then, as is immediately seen, $$X+Y=b+G$$

i.e., the total $X+Y$ depends simply linearly upon the width of the object being measured.

The output voltages U54 and U55 are accordingly connected in series according to FIG. 7. Connected in opposition to this total voltage is a partial voltage which is taken from an adjustable potentiometer 58. The potentiometer 58 is connected to a rectifier 59. The rectifier 59 and the measured-value rectifiers 54' and 55' are all fed by one and the same mains, as is represented in FIG. 7.

By the voltage difference of the rectifier 59 with the potentiometer 58, on the one hand, and of the rectifiers 54' and 55', on the other, there is controlled, through a zero amplifier 60 when increased sensitivity is desired, a servomotor 61 which shifts the tap of the potentiometer in either direction. By zero amplifier is meant one in which zero input yields zero final output, and the output is positive or negative depending on the input. The adjustment is linearly dependent upon the width of the object 56 being measured. The servomotor 61 can therefore, synchronously with the potentiometer, shift the pointer of an indicating device. The indicating device may be made very large if necessary. As a matter of fact, it is frequently desired that the measured value obtained should be legible even from a distance.

For the measurement of great lengths (tubes), the test heads 54 and 55 are arranged offset in the plane of the paper (FIG. 6) and measure only the deflection from a normal position. Nothing is altered in the principle of the measurement and of the connection (FIG. 7).

The measuring arrangement described has a surprising accuracy. With special precautions, by means of which a steady operation of the polygonal mirror is ensured and which have already been described in connection with FIG. 1, even deflections in the width of less than a millimeter are measurable in the case of a strip of sheet metal.

*Controlling devices*

The measured-value transmitter according to the invention can also be employed in such a manner that it performs or releases an operation as soon as the measuring voltage U has assumed a definite value and the object scanned is thus in a definite predetermined position. Such a case of employment is a supervision of a rolled material on a wide rolling path. It is found that the rolled material runs successively through various profiles of a roller and may be tilted after each passage and is pushed before the next profile. It is then important that the rolled material should then actually be in front of the correct profile, since, when it is introduced into a wrong profile owing to a failure of the shifting mechanism, the result may be severe damage to the rollers and to the stand. A test head according to the invention may then be provided as an additional safety device. It is arranged above the rolling path and scans its whole width. A measuring voltage is then obtained in accordance with the position of the rolled material on the rolling path. This measuring voltage is compared with a reference voltage which can be changed over in accordance with a definite program, for example by means of a voltage-divider that can be changed over. The running of the rolled material into the rollers is released only when the measuring voltage and the reference voltage are equal.

Figure 8:
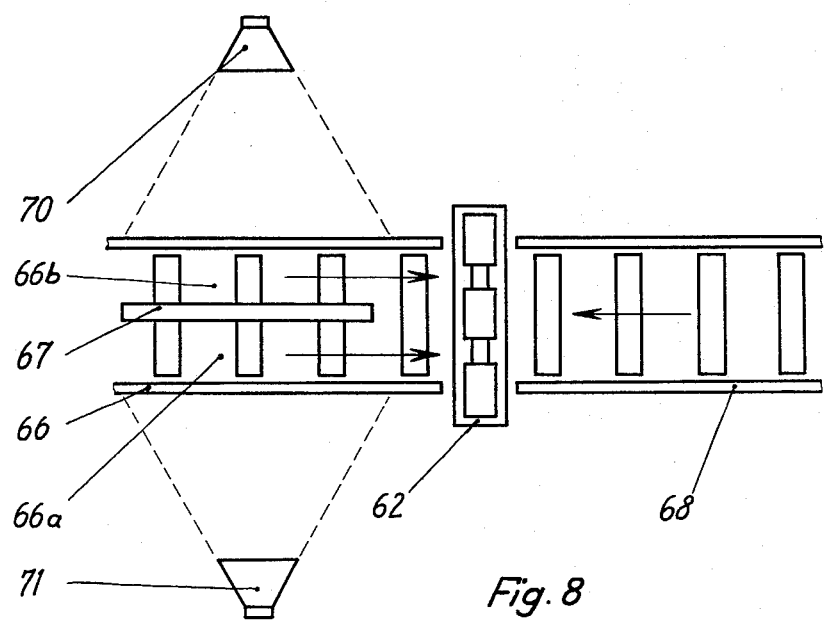
FIGURES 8 and 9 show, in plan and elevation respectively, the employment of the invention for the purpose of controlling a three-high rolling mill.
Figure 9:
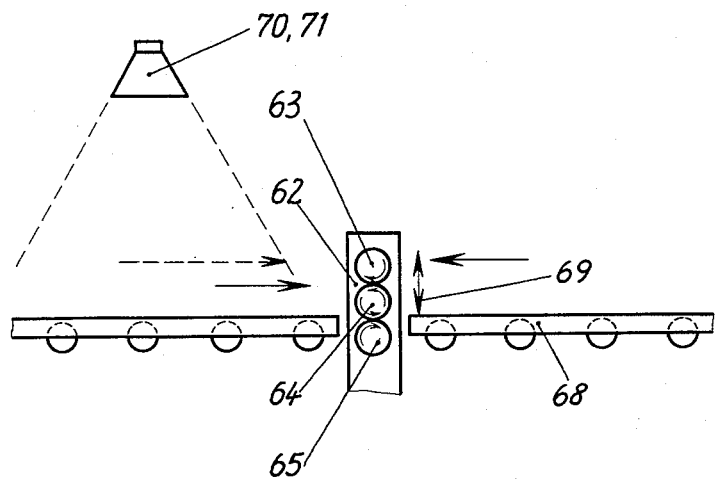

Another form of employment is shown in FIGS. 8 and 9. 62 denotes a three-high frame. This contains three rollers 63, 64 and 65, which are arranged above one another. The rolled material arrives on a rolling path 66 which is divided, in front of the frame, by a partition 67, into two paths 66a and 66b. The rolled material runs through on the path 66a, between the bottom pair of rollers 64 and 65 and arrives on to a tilting table 68. The tilting table 68 swings upwards in the directions of the arrow 69 (FIG. 9) and the rolled material is now passed through between the pair of rollers 63 and 64 and led into the path 66b by the somewhat inclined partition 67. On the path 66b, it now arrives into a second profile of the pair of rollers 64 and 65 and is then discharged.

While the first billet is being rolled, the next billet is already approaching. For an optimum utilization of the three-high frame, it is now essential that, while the first billet is running through the second profile (path 66b) of the pair of rollers 64 and 65, the second billet should, at the same time, pass through the first profile of this pair of rollers. For this purpose, care should then be taken that the second billet should leave the pair of rollers and run on to the tilting table at the same instant that the first billet has been completely rolled, in order that it should be possible for the tilting table to be tilted up.

This is achieved by two measured-value transmitters 70 and 71 according to the invention, which are arranged above the paths 66a and 66b and are represented in FIG. 8 as having been folded over through 90° into the plane of the paper. These give measured values for the positions of the two billets and release the running of the next billet into the three-high frame as soon as the previous billet has been introduced to such an extent that it is also completely rolled after the passing through of the other billet. In this way, an optimum utilization of the three-high frame can be obtained.

I claim:

1. A photoelectric measured-value transmitter including an optical scanning means comprising a rotating polygonal mirror scanning in a given direction along one path with a given frequency and having a photoelectric receiver delivering a pulse when the scanning means detects a change of view, a source of alternating reference voltage having a constant phase relation to said frequency, and means controlled by the phase position of the pulse in relation to the alternating voltage for providing a measured value related to the position of the detected change, characterized by having a cylinder lens arranged in front of the polygonal mirror with its cylinder axis in crossed position with respect to the rotating axis of the mirror, and having, in a position to focus on the receiver the measuring beam of rays reflected by the polygonal mirror from the lens, a second optical cylinder arranged with its cylinder axis in crossed position with respect to the axis of the cylinder lens.

2. A photoelectric measured-value transmitter according to claim 1, including a thyratron rectifier circuit fed by the reference A.C. voltage.

3. A photoelectric measured-value transmitter according to claim 2, characterized in that the scanning means scans the visual field with twice the frequency of the reference voltage, and the rectifier includes two thyratrons connected as a two-way rectifier and having control grids connected to receive the pulses from the receiver.

4. A photoelectric measured-value transmitter according to claim 3, characterized in that the thyratrons are fed by the reference voltage in phase opposition.

5. A photoelectric measured-value transmitter according to claim 4, characterized by the feature that the thyratrons are fed in opposite phases by the comparison alternating voltage, through opposite portions of a transformer with a central tapping.

6. A photoelectric measured-value transmitter according to claim 1, characterized in that the impulses provided by the receiver are applied to an impulse transducer comprising a saturated amplitude limiter tube and a differentiating circuit, the differentiating circuit including a transformer having its primary winding connected in series with the tube output.

7. A photoelectric measured-value transmitter according to claim 1, characterized in that the polygonal mirror is driven by a synchronous motor fed from the reference A.C. voltage.

8. The combination of a photoelectric measured-value transmitter according to claim 1 and means responsive thereto to control the speed of a working machine.

9. The combination according to claim 8, characterized in that the set value of a speed regulating device is controlled by the output voltage of the transmitter.

10. The combination according to claim 8, characterized in that the machine includes means for the loop regulation in rolling mills.

11. A photoelectric measured-value transmitter including an optical scanning means scanning in a given direction along one path with a given frequency and having a photoelectric receiver delivering a pulse when the scanning means detects a change of view, a source of alternating voltage having a constant phase relation to the scanning frequency, and electronic means triggered to activity in response to the pulse and deadened at the reversal of the alternating voltage for providing as an output signal a portion of a voltage derived from the alternating voltage source which output voltage signal is varied in magnitude in a relation to the length of the active period of the electronic means commencing with the triggering and ending with the deadening, means for opposing said output signal by a comparative voltage signal derived from the same source of alternating voltage, and control means operating in one direction or the other, depending on which of the opposing voltage signals is greater.

12. A photoelectric measured-value transmitter for use with a source of alternating voltage and including a pair of optical scanning means scanning fields of view with a frequency having a constant phase relation to said source of alternating voltage, said fields of view including respectively the ends of a dimension of an object to be measured, and each scanning means including a photoelectric receiver delivering a pulse when a respective end of the dimension is detected by the scanning means, means responsive to each photoelectric receiver to provide a measured voltage derived from said alternating voltage and related in magnitude to the phase position of the respective pulse in relation to the alternating voltage, and means for superimposing the measured voltages to provide a measured value related to said dimension.

13. A photoelectric measuring device for use with a source of alternating voltage and including a pair of measured-value transmitters, each transmitter including an optical scanning means scanning a field of view with a frequency having a constant phase relation to said source of alternating voltage, the fields of view of the two transmitters including respectively the ends of a dimension of an object to be measured, each transmitter including a photoelectric receiver delivering a pulse when a respective end of the dimension is detected by the scanning means and means responsive to each photoelectric receiver to provide a measured voltage derived from said alternating voltage and related in magnitude to the phase position of the pulse in relation to the alternating voltage, means connected to said responsive means to connect the measured voltages of the measured-value transmitters in series and including an adjustable tap potentiometer providing a partial voltage connected in opposition to the total series voltage, and a servomotor connected to shift the potentiometer tap in a direction depending on the relation of said voltages, the position of the potentiometer tap serving as a measurement for the dimension.

14. An arrangement according to claim 13, characterized by the feature that the potentiometer is connected to a rectifier which is fed by said source of alternating voltage.

15. A control system including a photoelectric measured-value transmitter according to claim 1 and control means responsive thereto.

16. Speed regulating apparatus including a photoelectric measured-value transmitter according to claim 1 and a speed regulating device responsive thereto.

17. The combination of driven web moving means forming a drooping loop, a photoelectric measured-value transmitter according to claim 1 scanning vertically across the loop and providing a signal varying with its amount of droop, and means responsive to the measured value for correcting the drive of the web moving means.

18. The combination of a driven conveyor, a photoelectric measured-value transmitter according to claim 1 scanning along the path of objects moved by the conveyor and means responsive to the measured value to regulate the drive of the conveyor to stop an object thereon at a predetermined position in the field of view of the scanning means.

19. The combination of a driven conveyor, a photoelectric scanning means to scan a fixed field of view including a portion of the path of the conveyor and to produce an output signal of varying measured magnitude related to the varying position within said field of view of an object it detects, and means connected to the conveyor and scanning means to regulate the drive of the conveyor in response to the measured magnitude to stop object thereon at a predetermined position in the field of view of the scanning means.

20. An apparatus for use with a source of alternating voltage and comprising in combination: a conveyor for moving an object along a path and a photoelectric measured-value transmitter including a pair of optical scanning means scanning fields of view with a frequency having a constant phase relation to said source of alternating voltage, said fields of view including a portion of said path and including respectively the ends of a dimension of said object, each scanning means including a photoelectric receiver delivering a pulse when the respective end of the dimension is detected by the scanning means, means responsive to each photoelectric receiver to provide a measured voltage derived from said alternating voltage and related in magnitude to the phase position of the pulse in relation to the alternating voltage, and means for superimposing the measured voltages to provide a measured value related to said dimension.

21. An apparatus as set forth in claim 20, wherein each scanning means scans its field along a line parallel to the line of scan of the other scanning means and the scanning movements of the two are approximately 180° out of phase with each other.

22. An apparatus as set forth in claim 21, wherein the conveyor is part of a sheet rolling mill, said fields of view extend transversely to said path, said dimension is the width of a sheet, and said ends are the side edges of the sheet.

References Cited by the Examiner

UNITED STATES PATENTS

| | | | |
|---|---|---|---|
| 1,951,426 | 3/1934 | Littler | 250—223 X |
| 2,548,590 | 4/1951 | Cook | 250—219 X |
| 2,916,632 | 12/1959 | Peterson | 250—219 |
| 2,931,917 | 4/1960 | Beelitz | 250—219 |

RALPH G. NILSON, *Primary Examiner.*

RICHARD M. WOOD, WALTER STOLWEIN,
*Examiners.*

R. K. SCHAEFER, *Assistant Examiner.*